(12) United States Patent
Qin et al.

(10) Patent No.: US 11,774,670 B2
(45) Date of Patent: Oct. 3, 2023

(54) DISPLAY PANEL, METHOD FOR MANUFACTURING A DISPLAY PANEL AND DISPLAY DEVICE

(71) Applicants: Beijing BOE Display Technology Co., Ltd., Beijing (CN); BOE TECHNOLOGY GROUP CO., LTD., Beijing (CN)

(72) Inventors: Xuefei Qin, Beijing (CN); Guangyun Tong, Beijing (CN); Yu Zhang, Beijing (CN); Bochang Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 229 days.

(21) Appl. No.: 17/434,479

(22) PCT Filed: Feb. 2, 2021

(86) PCT No.: PCT/CN2021/074882
§ 371 (c)(1),
(2) Date: Aug. 27, 2021

(87) PCT Pub. No.: WO2021/190154
PCT Pub. Date: Sep. 30, 2021

(65) Prior Publication Data
US 2022/0357504 A1  Nov. 10, 2022

(30) Foreign Application Priority Data

Mar. 25, 2020  (CN) .......................... 202010218282.8

(51) Int. Cl.
*F21V 8/00* (2006.01)

(52) U.S. Cl.
CPC .......... *G02B 6/0088* (2013.01); *G02B 6/0043* (2013.01); *G02B 6/0055* (2013.01); *G02B 6/0083* (2013.01)

(58) Field of Classification Search
CPC .. G02B 6/0088; G02B 6/0043; G02B 6/0055; G02B 6/0083
See application file for complete search history.

(56) References Cited

U.S. PATENT DOCUMENTS

2008/0106915 A1\* 5/2008 Okuda ................. G02B 6/0063
                                                              362/628
2017/0103717 A1\* 4/2017 Kuo ......................... G09G 3/36

FOREIGN PATENT DOCUMENTS

CN        1584709 A      2/2005
CN      100440005 C     12/2008
(Continued)

OTHER PUBLICATIONS

China Patent Office, CN202010218282.8 First Office Action dated Mar. 31, 2021.
(Continued)

*Primary Examiner* — Mary Ellen Bowman
(74) *Attorney, Agent, or Firm* — HOUTTEMAN LAW LLC (57) ABSTRACT

The present disclosure provides a display panel, a method for manufacturing a display panel and a display device. The display panel includes a back frame, a backlight module and a panel, where the backlight module and the panel are arranged in the back frame, the back frame includes a back plate, and the back plate is provided with a hollow-out area. The backlight module is arranged between the back plate and the panel and includes a light transmissive area and a light emitting area, and the light transmissive area corresponds to the hollow-out area. The panel is arranged on a side of the backlight module away from the back plate, and (Continued)

includes a display area and a transparent area, where the display area corresponds to the light emitting area, and the transparent area corresponds to the light transmissive area.

20 Claims, 7 Drawing Sheets

(56) References Cited

FOREIGN PATENT DOCUMENTS

| | | | | |
|---|---|---|---|---|
| CN | 201772396 U | | 3/2011 | |
| CN | 102918435 A | * | 2/2013 | ............. F21K 9/232 |
| CN | 104076520 A | | 10/2014 | |
| CN | 205003316 U | | 1/2016 | |
| CN | 205536821 U | | 8/2016 | |
| CN | 106707620 A | | 5/2017 | |
| CN | 206906753 U | | 1/2018 | |
| CN | 207181887 U | | 4/2018 | |
| CN | 209674139 U | | 11/2019 | |
| CN | 210109527 U | | 2/2020 | |
| CN | 111261034 A | | 6/2020 | |
| JP | 2005034282 A | | 2/2005 | |

OTHER PUBLICATIONS

Patent Patent Office, CN202010218282.8 Second Office Action dated Nov. 18, 2021.

* cited by examiner

DISPLAY PANEL, METHOD FOR MANUFACTURING A DISPLAY PANEL AND DISPLAY DEVICE

TECHNICAL FIELD

The present disclosure relates to the field of display technology, and particularly relates to a display panel, a method for manufacturing a display panel and a display device.

BACKGROUND

With the development of display technologies, in some scenarios, it is generally required that the display panel can perform various combined displays, for example, the display panel may have a display area and a hollow-out area, and display is performed in the display area, and the hollow-out area may be used for placing another device or an external display panel. However, how to implement a display panel with various combined display functions is a problem to be solved.

SUMMARY

The present disclosure is directed to at least one of the technical problems in the related art, and provides a display panel, a method for manufacturing a display panel, and a display device.

In a first aspect, an embodiment of the present disclosure provides a display panel, including a back frame, a backlight module and a panel, where the backlight module and the panel are arranged in the back frame; the back frame includes a back plate, and the back plate is provided with a hollow-out area;

the backlight module is arranged between the back plate and the panel and includes a light transmissive area and a light emitting area, and the light transmissive area corresponds to the hollow-out area;

the panel is arranged on a side, away from the back plate, of the backlight module and includes a display area and a transparent area, the display area corresponds to the light emitting area, and the transparent area corresponds to the light transmissive area.

The display panel provided by the present embodiment has a hollow-out area on the back plate of the back frame, the portion of the backlight module corresponding to the hollow-out area is the light transmissive area, the rest portion of the backlight module is the light emitting area, the portion of the panel corresponding to the light transmissive area is the transparent area, and the portion of the panel corresponding the light emitting area is the display area, the light can be transmitted through the light transmissive area, the transparent area and the hollow-out area, and thus, the display panel can realize multifunctional display, displays pictures normally at the portion corresponding to the display area of the display panel, and realizes transparent display or area display at the portion of the display panel corresponding to the transparent area.

In some implementations, the backlight module includes at least one light bar and a light guide plate; the light bar are arranged on a side of the light guide plate, the light guide plate is arranged on a side of the back plate proximal to the panel, and the light guide plate has a plurality of light guide points only at a position corresponding to the light emitting area.

In some implementations, the back plate includes a bottom plate and a side plate arranged at an edge of the bottom plate;

an edge of the light guide plate is provided with a plurality of notch grooves, a plurality of inner fasteners are arranged on the side plate, the notch grooves correspond to the inner fasteners in a one-to-one mode, and the notch grooves are matched with the inner fasteners to fix the light guide plate to the back plate.

In some implementations, the light guide plate includes a first side and a second side which are opposite to each other, and a third side and a fourth side which are opposite to each other, the first side is disposed between the second side and the third side, the light bar are disposed on the first side of the light guide plate;

the edge of the light guide plate is provided with three notch grooves, including a first notch groove, a second notch groove and a third notch groove, where the first notch groove is arranged at a position of the third side proximal to the first side, the second notch groove is arranged at a position of the fourth side proximal to the first side, and the third notch groove is arranged at a position of the second side proximal to the fourth side;

the side plate is provided with three inner fasteners including a first inner fastener corresponding to the first notch groove, a second inner fastener corresponding to the second notch groove and a third inner fastener corresponding to the third notch groove.

In some implementations, the light bar has a connector thereon for connecting an external backlight driving circuit;

a groove is formed at a position on the first side of the light guide plate corresponding to the connector, the groove and the third notch groove are oppositely arranged, the groove is used for accommodating the connector, the groove is matched with the connector, and the third notch groove is matched with the third inner fastener to assist aligning of the light guide plate with the back plate.

In some implementations, a width of each notch groove is larger than a width of each inner fastener; and a gap exists between opposite surfaces of the inner fastener and the notch groove.

In some implementations, the backlight module includes a light guide plate and an optical sheet, the light guide plate is disposed on a side of the back plate proximal to the panel, and the optical sheet is disposed on a side of the light guide plate away from the back plate; where, a portion of the optical sheet corresponding to the light transmissive area is of a hollow-out structure.

In some implementations, the back plate includes a bottom plate and a side plate provided at an edge of the bottom plate;

an edge of the optical sheet is provided with a plurality of hangers, and each hanger has an opening therein, the bottom plate is provide with a plurality of limiting columns on a side of the bottom plate proximal to the optical sheet, the hangers are in one-to-one correspondence with the limiting columns, each limiting column passes through the opening to fix relative position of the optical sheet and the back plate.

In some implementations, the hangers include a coarse positioning hanger and a fine positioning hanger, the coarse positioning hanger is provided with a first opening, and the fine positioning hanger is provided with a second opening;

the first opening is an elliptical opening, the second opening is a circular opening, a length of a short axis of the first opening is larger than or equal to a diameter of the second opening, and a length of a long axis of the first opening is larger than the diameter of the second opening.

In some implementations, the backlight module further includes a light bar disposed on a side of the light guide plate;

the optical sheet includes a first side and a second side which are connected, the first side corresponds to a side edge of the light guide plate for arranging the light bar, and the second side of the optical sheet includes a coarse positioning hanger and a fine positioning hanger which are adjacently arranged.

In some implementations, the backlight module includes a light guide plate and a reflective layer, the light guide plate is disposed on a side of the back plate proximal to the panel, the reflective layer is disposed between the light guide plate and the back plate, and a portion of the reflective layer corresponding to the light transmissive area is of a hollow-out structure.

In some implementations, the back plate includes a bottom plate and a side plate provided on an edge of the bottom plate;

an edge of the reflective layer is provided with a plurality of lugs, the side plate is provided with a plurality of grooves, the lugs correspond to the grooves one to one, and the lugs are matched with the grooves to assist aligning of the reflective layer with the back plate.

In some implementations, a width of each groove is greater than a width of each lug.

In some implementations, an area of an orthographic projection of the hollow-out area on a plane where the back plate is located is larger than an area of an orthographic projection of the light transmissive area on the plane where the back plate is located.

In some implementations, the back plate includes a bottom plate and a side plate provided on an edge of the bottom plate;

the back frame further includes a middle frame, at least one snap-fit is arranged on the middle frame, at least one slot is formed in the side plate, the snap-fit corresponds to the slot in a one-to-one mode, and the snap-fit is matched with the slot to fix the middle frame onto the side plate of the back plate.

In some implementations, the back plate includes a bottom plate and a side plate provided on an edge of the bottom plate;

the back frame further includes a middle frame and an outer frame, the middle frame is sleeved on the side plate, and the outer frame is sleeved on the middle frame; and the outer frame is of a spliced structure.

In some implementations, the display panel further includes a transparent cover plate disposed on a side of the back plate away from the backlight module and covering the hollow-out area.

In some implementations, the back plate includes a plurality of reinforcing ribs thereon, and the reinforcing ribs are formed by protruding the back plate in a direction away from the backlight module.

In some implementations, a back pressure line is provided along an edge of the hollow-out area of the back plate.

In a second aspect, an embodiment of the present disclosure provides a method for manufacturing a display panel, including:

manufacturing a back frame, where a back plate in the back frame is manufactured, and a hollow-out area is manufactured in the back plate;

manufacturing a backlight module on the back plate, where a portion of the backlight module corresponding to the hollow-out area is manufactured as a light transmissive area, and the rest portion of the backlight module is manufactured as a light emitting area; and manufacturing a panel on a side of the backlight module away from the back plate, where a portion of the panel corresponding to the light emitting area is manufactured as a display area, and a portion of the panel corresponding to the light transmissive area is manufactured as a transparent area.

In a third aspect, an embodiment of the present disclosure provides a display device, including the display panel described above.

In some implementations, the display device includes a slot machine;

the display panel includes the back frame, the backlight module and the panel, where the backlight module and the panel are arranged in the back frame;

the back frame includes the back plate, and the back plate is provided with the hollow-out area;

the backlight module is arranged between the back plate and the panel and includes the light transmissive area and the light emitting area, and the light transmissive area corresponds to the hollow-out area;

the panel is arranged on the side of the backlight module away from the back plate, and includes the display area and the transparent area, the display area corresponds to the light emitting area, and the transparent area corresponds to the light transmissive area;

the slot machine includes a lottery device which is arranged corresponding to the hollow-out area, the light transmissive area and the transparent area, the slot machine displays at a position corresponding to the display area, and lottery drawing is carried out at a position corresponding to the transparent area.

In some implementations, an area of an orthographic projection of the lottery device on a plane where the back plate is located is smaller than an area of an orthographic projection of the light transmissive area and/or the transparent area on the plane where the back plate is located;

the area of the orthographic projection of the light transmissive area and/or the transparent area on the plane where the back plate is located is smaller than an area of an orthographic projection of the hollow-out area on the plane where the back plate is located.

DETAILED DESCRIPTION

In order to make the objects, technical solutions and advantages of the present disclosure more apparent, the present disclosure will be described in further detail with reference to the accompanying drawings. All other embodiments, which can be obtained by a person skilled in the art without making any creative effort based on the embodiments in the present disclosure, belong to the protection scope of the present disclosure.

The shapes and sizes of the components in the drawings are not in true scales, but are merely intended to facilitate an understanding of the contents of the embodiments of the present disclosure.

Unless defined otherwise, technical or scientific terms used herein shall have the ordinary meaning as understood by one of ordinary skill in the art to which this disclosure belongs. The use of "first", "second" and the like in this disclosure is not intended to indicate any order, quantity, or importance, but rather is used to distinguish one element from another. Also, the use of the terms "a", "an", or "the" and similar words do not denote a limitation of quantity, but rather denote the presence of at least one. The word "comprising" or "including", and the like, means that the element or item preceding the word contains the element or item listed after the word and its equivalent, but does not exclude other elements or items. The terms "connected" or "coupled" and the like are not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Figure 1:
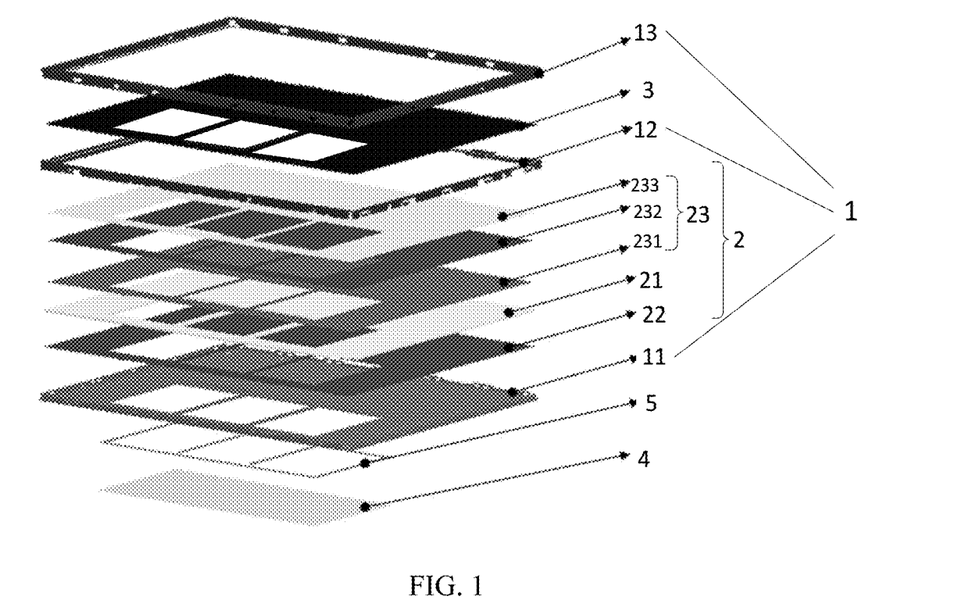
FIG. 1 is a schematic structural diagram of a display panel according to an embodiment of the present disclosure.

In a first aspect, as shown in FIG. 1, an embodiment of the present disclosure provides a display panel, which includes a back frame 1, and a backlight module 2 and a panel 3 disposed in the back frame 1.

Figure 2:
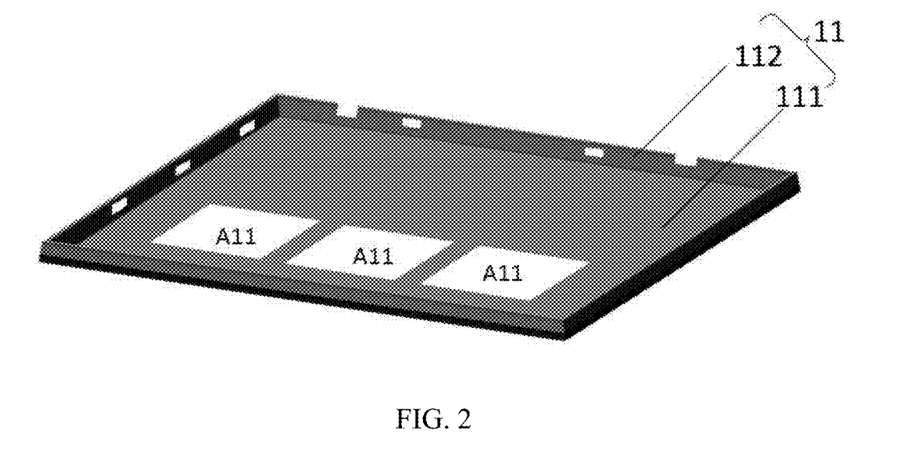
FIG. 2 is a schematic structural diagram of a back plate of a display panel according to an embodiment of the present disclosure.

Specifically, as shown in FIGS. 1 to 4, the back frame 1 may include a back plate 11, a middle frame 12, and an outer frame 13. Referring to FIG. 2, the back plate 11 has a hollow-out area A11, that is, a hole is formed in a position of the back plate 11 corresponding to the hollow-out area A11 to form the hollow-out area A11, and external light can transmit through the hollow-out area A11 of the back plate 11.

Figure 3:
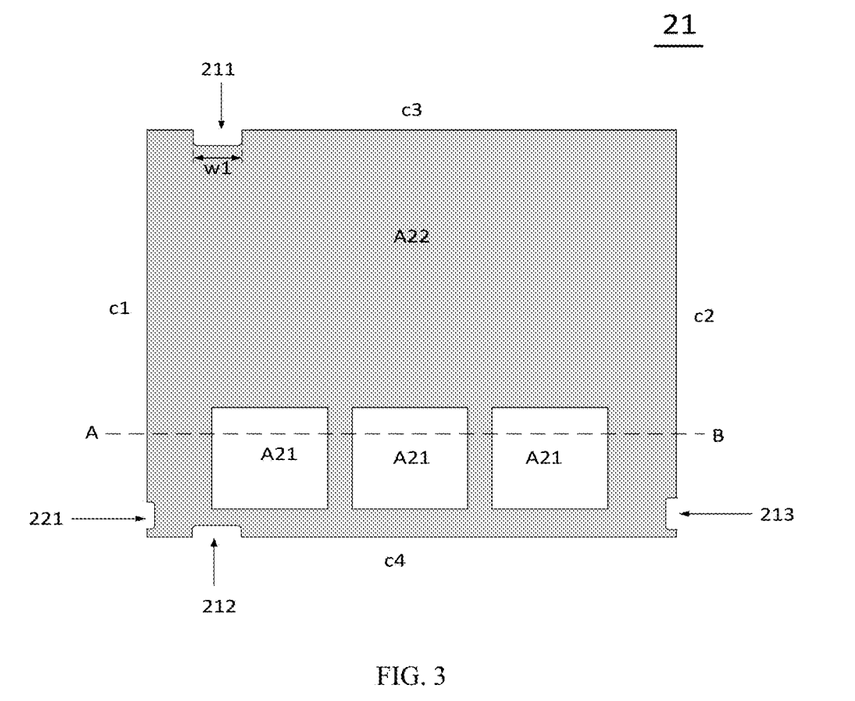
FIG. 3 is a schematic structural diagram of a light guide plate of a display panel according to an embodiment of the present disclosure.

Further, referring to FIG. 3, the backlight module 2 is disposed between the back plate 11 and the panel 3, the backlight module 1 includes a light transmissive area A21 and a light emitting area A22, the light transmissive area A21 of the backlight module 2 corresponds to the hollow-out area A11 of the back plate 11, that is, an orthographic projection of the light transmissive area A21 on a plane where the back plate 11 is located is overlapped with an orthographic projection of the hollow-out area A11 on the plane where the back plate 11 is located, and external light can be transmitted through the hollow-out area A11 and the light transmissive area A21.

Figure 4:
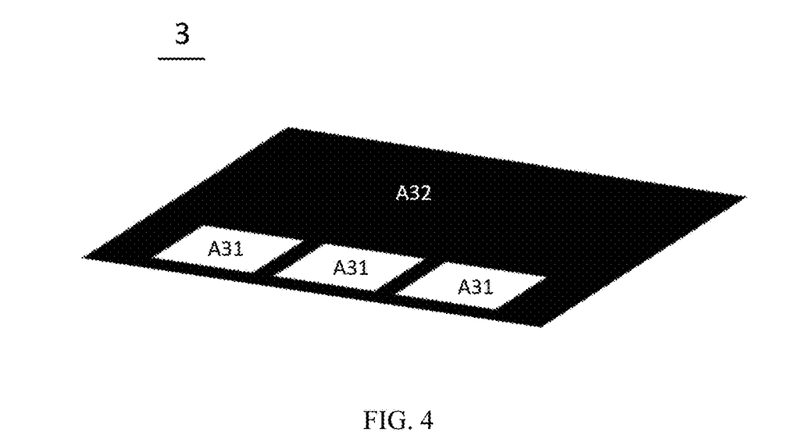
FIG. 4 is a schematic structural diagram of a panel of a display panel according to an embodiment of the present disclosure.

Further, referring to FIG. 4, the panel 3 is disposed on a side of the backlight module 2 away from the back plate 11, the panel 3 includes a display area A32 and a transparent area A31, the display area A32 of the panel 3 corresponds to the light emitting area A22 of the backlight module 2, and the transparent area A31 of the panel 3 corresponds to the light transmissive area A21 of the backlight module 2, that is, an orthographic projection of the display area A32 on a plane where the back plate 11 is located overlaps an orthographic projection of the light emitting area A22 on the plane where the back plate 11 is located, an orthographic projection of the transparent area A31 on the plane of the back plate 11 overlaps an orthographic projection of the light transmissive area A21 on the plane where the back plate 11 is located, and external light can be transmitted through the hollow-out area A11, the light transmissive area A21, and the transparent area A31.

It should be noted that the hollow-out area A11 of the back plate 11, the light transmissive area A21 of the backlight module 2, and the transparent area A31 of the panel 3 each may have any shape, for convenience of description, the embodiments of the present disclosure are described by taking a case where the hollow-out area A11 includes three rectangular sub-hollow-out areas, and the shapes of the light transmissive area A21 and the transparent area A31 correspond to that of the hollow-out area A11 as an example, which does not limit the embodiments of the present disclosure.

In the display panel provided in the embodiment of the present disclosure, the back plate 11 of the back frame 1 has the hollow-out area A11, the position of the backlight module 2 corresponding to the hollow-out area A11 is the transparent area A21, the remaining position of the backlight module 2 is the light emitting area A22, the light emitting area A22 can provide a backlight source for the panel 3, the position of the panel 3 corresponding to the light transmissive area A21 is the transparent area A31, and the position of the panel 3 corresponding to the light emitting area A22 is the display area A32, so that external light can be transmitted through the transmissive area A21, the transparent area A31, and the hollow-out area A11, and the display panel can implement multi-functional display, display a picture normally at the position of the display panel corresponding to the display area A31 of the panel 3, and realize transparent display at the position of the display panel corresponding to the transparent area A32 of the panel 3, or perform area display separately by providing an external display panel at the position of the transparent area A32.

In some implementations, as shown in FIG. 1 and FIG. 2, the back plate 11 includes a bottom plate 111, and a side plate 112 disposed at an edge of the bottom plate 111, and the hollow-out area A11 is located in the bottom plate 111.

In some implementations, as shown in FIG. 1, the backlight module 3 may include a reflective layer 22, a light guide plate 21, an optical sheet 23, and at least one light bar (not shown). The reflective layer 22, the light guide plate 21 and the optical sheet 23 are sequentially arranged on a side of the back plate 11 proximal to the panel 3 in a direction from the back plate 11 to the panel 3, the at least one light bar is arranged on a side of the light guide plate 21 and attached to the light guide plate 21, and light emitted by the light bar enters the light guide plate 21 and is diffused to a light exiting surface of the panel 3 by the light guide plate 21. The light bar may be disposed on the bottom plate 111, or may be disposed on the side plate 112, which is not limited herein.

Figure 5:
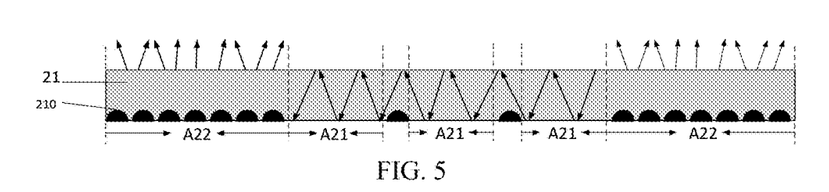
FIG. 5 is a cross-sectional view of the light guide plate of FIG. 3 taken along a direction A-B.

In some implementations, as shown in FIGS. 3 and 5, where FIG. 5 is a cross-sectional view of the light guide plate 21 along the line A-B in FIG. 3, the light guide plate 21 is only provided with a plurality of light guide points 210 at a position corresponding to the light emitting area A22 of the backlight module 2, and the light guide plate 21 does not have light guide points at a position corresponding to the light transmissive area A21 of the backlight module 2, the light guide points can change an angle of incident light, the light emitted by the light bar can be totally reflected after entering the light guide plate 21, so that the light guide points change a reflection angle of the totally reflected light at the position of the light guide plate 21 corresponding to the light emitting area A22, so that the light is diffused to a light exiting side of the light guide plate 21 proximal to the panel 3, so as to provide a backlight light source for the display area A32 of the panel 3, and the display area A32 of the panel 3 can display pictures, and the light guide plate 21 does not have light guide points at the position corresponding to the light transmissive area A21, so that the light emitted by the light bar can be totally reflected in the light guide plate 21 at the position corresponding to the light transmissive area A21, and the light guide plate 21 does not emit light at the position corresponding to the light transmissive area A21.

Figure 6:
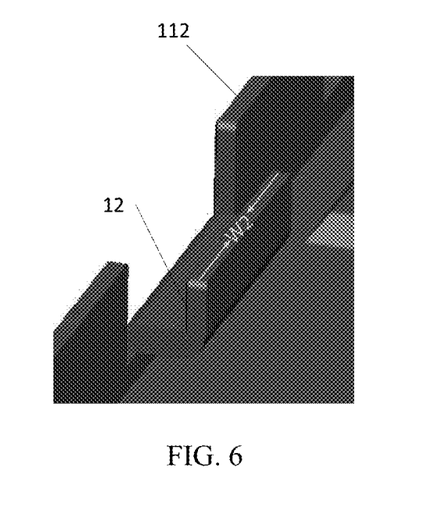
FIG. 6 is a schematic structural diagram of an inner fastener on a side plate according to the embodiment of the present disclosure.

In some implementations, as shown in FIG. 1, FIG. 3, and FIG. 6, FIG. 6 is a partial schematic diagram of a position where the side plate 112 is provided with an inner fastener 12, an edge of the light guide plate 21 is provided with a plurality of notch grooves (e.g., 211, 212, 213 in FIG. 3), the side plate 112 of the back plate 11 is provided with a plurality of inner fasteners 12, the notch grooves correspond to the inner fasteners 12 one by one, each of the inner fasteners 12 may be a bent structure formed by bending the side plate 112 inward, and the inner fasteners 12 may be respectively snapped into the notch grooves corresponding thereto to fix the light guide plate 21 and the back plate 11 together. The specific numbers of the notch grooves and the inner fasteners may be set as required. The specific structure of the notch groove and the inner fastener 12 may include various forms, and the specific structure may be designed according to the needs, and is not limited herein.

It should be noted that the display panel provided in the embodiment of the present disclosure may have any shape, and includes any number of side edges, and in the present embodiment, a case where the display panel is a rectangular panel, and includes four side edges is taken as an example for description, but this does not limit the embodiment of the present disclosure.

In some implementations, as shown in FIG. 3, taking the display panel being a rectangular panel as an example, correspondingly, the light guide plate 21 is a rectangular light guide plate, and the light guide plate 21 includes a first side c1 and a second side c2 which are opposite to each other, and a third side c3 and a fourth side c4 which are opposite to each other, and the first side c1 is disposed between the second side c2 and the third side c3. A direction in which the first side c1 and the second side c2 extend is a Y direction, and a direction in which the third side c3 and the fourth side c4 extend is an X direction. The backlight module 2 includes at least one light bar, for convenience of description, the present embodiment is described by taking a case where the backlight module 2 including one light bar arranged on the first side c1 of the light guide plate 21 as an example. The edge of the light guide plate 21 includes three notch grooves, namely a first notch groove 211, a second notch groove 212 and a third notch groove 213, where the first notch groove 211 is disposed at a position of the third side c3 proximal to the first side c1, for example, the position of the third side c3 12 mm away from the first side c1, the second notch groove 212 is disposed at a position of the fourth side c4 proximal to the first side c1, for example, a position of the fourth side c4 12 mm away from the first side c1, and the third notch groove 213 is disposed at a position of the second side c2 proximal to the fourth side c4. Correspondingly, the side plate 112 of the back plate 11 has three inner fasteners thereon, which are respectively a first inner fastener corresponding to the first notch groove 211, a second inner fastener corresponding to the second notch groove 212, and a third inner fastener corresponding to the third notch groove 213, and the specific structures of the three inner fasteners can be seen in FIG. 6. The first notch groove 211 and the second notch groove 212 are respectively disposed at positions of the third side c3 and the fourth side c4 proximal to the light bar (i.e., the first side c1), so as to assist the light guide plate 21 to be aligned and attached to the light bar, and the first inner fastener on the side plate 112 of the back plate 11 is clamped into the first notch groove 211, and the second inner fastener is clamped into the second notch groove 212, so as to limit the displacement of the light guide plate 21 in the X direction relative to the back plate 11, that is, the first notch groove 211 and the second notch groove 212 can assist fine positioning between the light guide plate 21 and the back plate 11 in the X direction.

Further, as shown in FIG. 3, the light bar has a connector for connecting an external backlight driving circuit, and is disposed on the first side c1 of the light guide plate 21. A groove 221 is formed in the first side c1 of the light guide plate 21 at a position corresponding to the connector, the groove 221 and the third notch groove 213 are disposed oppositely, the groove 221 can be used for accommodating the connector, and if the connector on the light bar is clamped into the groove 221 on the first side c1 of the light guide plate 21, the third inner fastener on the side plate 112 is clamped into the third notch groove 213 on the second side c2 of the light guide plate 21, so that the displacement of the light guide plate 21 relative to the back plate 11 in the Y direction can be limited, that is, the groove 221 and the third notch groove 213 can assist fine positioning between the light guide plate 21 and the back plate 11 in the Y direction.

Figure 7:
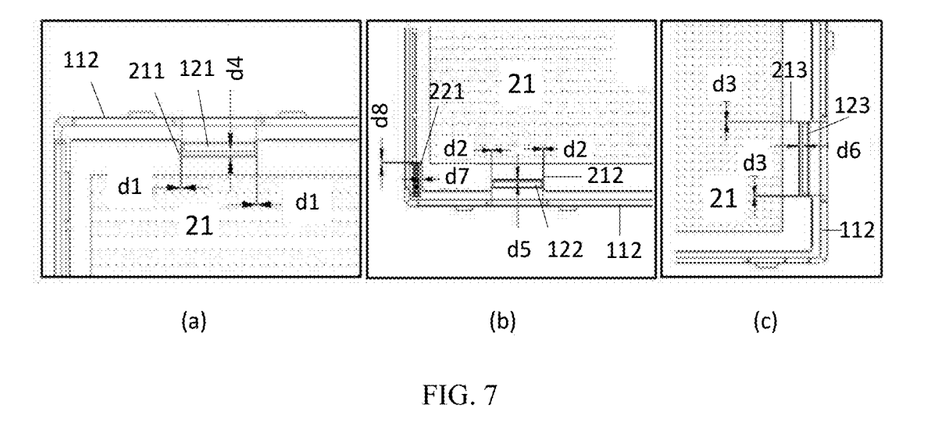
FIG. 7 is a schematic structural diagram of a notch groove and a inner fastener according to an embodiment of the present disclosure.

In some implementations, as shown in FIG. 3, FIG. 6 and FIG. 7, (a) in FIG. 7 is a partial schematic diagram of the first notch groove 211 and the first inner fastener 121 on the light guide plate 21, (b) is a partial schematic diagram of the second notch groove 212 and the second inner fastener 122 on the light guide plate 21, and (c) is a partial schematic diagram of the third notch groove 213 and the third inner fastener 123 on the light guide plate 21. A width W1 of the notch groove is greater than a width W2 of the inner fastener 12, so that the phenomenon that the notch groove is not matched with the inner fastener due to factors such as assembly tolerance, manufacturing precision and the like, and the inner fastener cannot be clamped into the notch groove, is avoided. For example, in FIG. 7, a first gap d1 is provided between the side of the first notch groove 211 and the side of the first inner fastener 121, a second gap d2 is provided between the side of the second notch groove 212 and the side of the second inner fastener 122, a third gap d3 is provided between the side of the third notch groove 213 and the side of the third inner fastener 123, and the first gap d1, the second gap d2 and the third gap d3 may be set as required, for example, d1=d2=d3=0.15 mm. Accordingly, in consideration of the fitting tolerance between the connector of the light bar and the groove 221, in order to prevent the light guide plate 21 from pressing the connector, a width of the groove 221 in the X direction is greater than a width of the connector in the X direction, that is, an X gap d7 exists between the connector and the groove 221, and a width of the groove 221 in the Y direction is greater than a width of the connector in the Y direction, that is, a Y gap d8 exists between the connector and the groove, for example, d7=d8=0.2 mm Since the light guide plate 21 may change in size at different temperatures, for example, the light guide plate 21 may expand if the temperature is higher, a gap may exist between opposite surfaces of the inner fastener 12 and the notch groove to reserve a sufficient expansion space for the light guide plate 21. For example, the first notch groove 211 is disposed on the third side c3 of the light guide plate 21, the second notch groove 212 is disposed on the fourth side c4 of the light guide plate 21, the first notch groove 211 and the second notch groove 212 are disposed opposite to each other in the Y direction, a fourth gap d4 exists between opposite surfaces of the first notch groove 211 and the first inner fastener 121, and a fifth gap d5 exists between opposite surfaces of the second notch groove 212 and the second inner fastener 122, so that the expansion space reserved in the Y direction of the light guide plate 21 is d4+d5, and the specific values of d4 and d5 may be calculated according to a size of the display panel and expansion characteristics of the light guide plate 21, for example, d4 may be 0.8 mm, and d5 may be 0.2 mm. Accordingly, the third notch groove 213 is disposed on the second side c2, the groove 221 is disposed on the first side c1, the third notch groove 213 and the groove 221 are disposed oppositely in the X direction, a sixth gap d6 exists between opposite surfaces of the third notch groove 214 and the third inner fastener 123, and an X gap d7 exists between opposite surfaces of the groove 221 and the connector, so that an expansion space reserved in the X direction of the light guide plate 21 is d6+d7, and the specific values of d6 and d7 may be calculated according to the size of the display panel and the expansion characteristics of the light guide plate 21, for example, d6 may be 0.8 mm, since the groove 221 reserves the expansion space in the X direction for the light guide plate 21, so the X gap d7 may be greater than the Y gap d8, and for the example in which d8=0.2 mm, d7 may be 0.5 mm.

In some implementations, as shown in FIG. 1, the optical sheet 23 in the backlight module 2 is disposed on a side of the light guide plate 21 away from the back plate 11. A position of the optical sheet 23 corresponding to the light transmissive area A21 of the backlight module 2 is a hollow-out structure. As an example, along a direction from the back plate 11 to the panel 3, the optical sheet 23 may include a lower diffusion sheet 231, a prism 232, and an upper diffusion sheet 233. In the following description, the lower diffusion sheet 231 is taken as an example, and the other sheets in the optical sheet 23 each also have a connection structure for connecting to the back plate 11, similar to that of the lower diffusion sheet 231.

Figure 8:
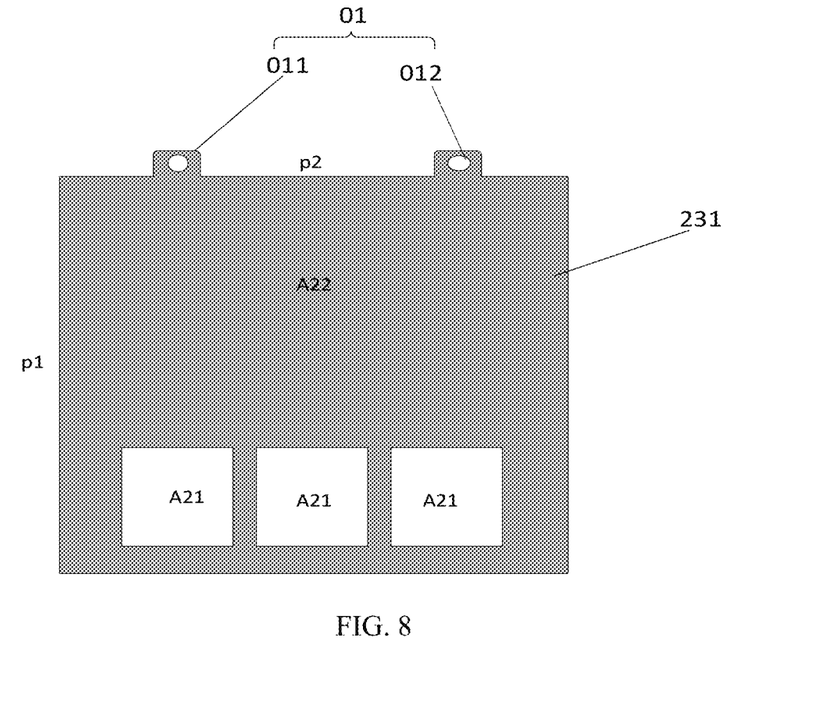
FIG. 8 is a schematic structural diagram of a diffusion sheet of a display panel according to an embodiment of the present disclosure.
Figure 9:
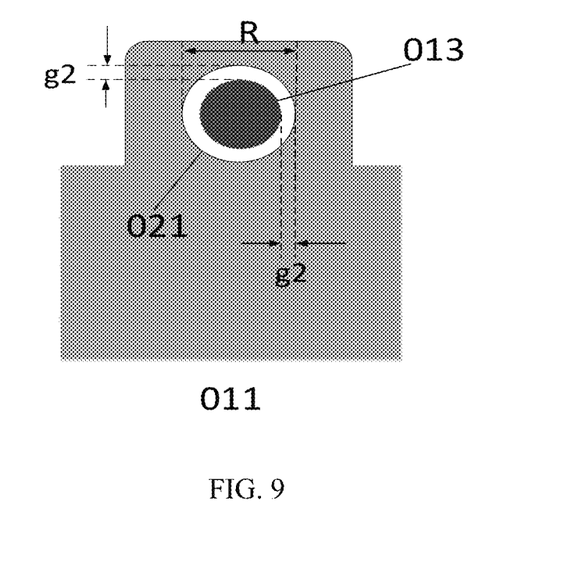
FIG. 9 is a partial schematic view of a fine positioning hanger of FIG. 8.
Figure 10:
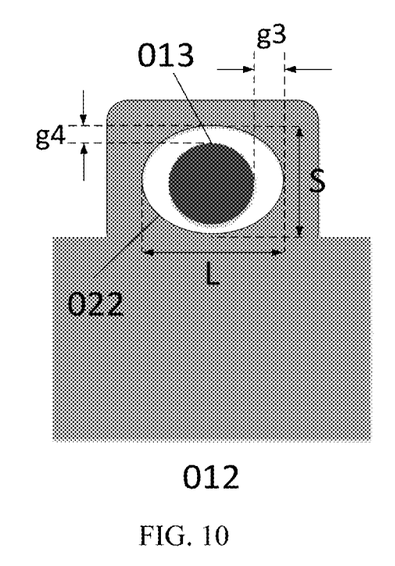
FIG. 10 is a partial schematic view of a coarse positioning hanger of FIG. 8.

In some implementations, as shown in FIGS. 8 to 10, an edge of the lower diffusion sheet 231 is provided with a plurality of hangers 01, each hanger 01 has an opening therein, a side of the bottom plate 111 of the back plate 11 proximal to the optical sheet 23 is provided with a plurality of limiting columns 013, the hangers 01 correspond to the limiting columns 013 one by one, and the limiting columns 013 on the bottom plate 111 penetrate through the openings in the hangers 01 respectively to fix the relative positions of the lower diffusion sheet 231 and the back plate 11, so as to prevent the lower diffusion sheet 231 from wrinkling and affecting the diffusion effect. The specific number and the providing positions of the hangers 01 may be set according to needs, and are not limited herein.

In some implementations, as shown in FIGS. 8 to 10, the hangers 01 of the lower diffusion sheet 231 includes a coarse positioning hanger 012 and a fine positioning hanger 011, where if the lower diffusion sheet 231 is fixed on the back plate 11 through the limiting columns 013, the coarse positioning hanger 012 is used for preliminarily positioning the lower diffusion sheet 231 relative to the back plate 11, and the fine positioning hanger 011 is used for further fixing the diffusion sheet 231 relative to the back plate 11. Referring to FIG. 10, the coarse positioning hanger 012 has a first opening 022, and referring to FIG. 9, the fine positioning hanger 011 has a second opening 021. The first opening 022 may be an elliptical hole, the second opening 021 may be a circular hole, a short axis S of the first opening 022 in the coarse positioning hanger 012 is greater than or equal to a diameter R of the second opening 021 in the fine positioning hanger 011, and a long axis L of the first opening 022 in the coarse positioning hanger 012 is greater than the diameter R of the second opening 021 in the fine positioning hanger 011. The direction of the long axis L of the first opening 022 is parallel to the X direction, and the direction of the short axis S is parallel to the Y direction, after the lower diffusion sheet 231 is mounted on the back plate 11, the movable gap of the lower diffusion sheet 231 in the X direction is limited to a gap distance g3 between the long axis L of the first opening 022 and the limiting column 013 by the coarse positioning hanger 012, and the movable gap of the lower diffusion sheet 231 in the Y direction is limited to a gap distance g4 between the short axis S of the first opening 022 and the limiting column 013, for example, g3 may be 0.5 mm, and g4 may be 0.2 mm. The movable gaps of the lower diffusion sheet 231 in the X direction and the Y direction are bother further limited within a gap distance g2 between the diameter R of the second opening 021 and the limiting column 013 by the fine positioning hanger 011, where g4 is greater than or equal to g2 and less than g3, and g2 may be 0.2 mm. By adopting the positioning manner of the hangers 01 and the limiting columns 013, the displacement of the lower diffusion sheet 231 on the back plate 11 is small, and the probability that the display panel scratches the lower diffusion sheet 231 (i.e., the optical sheet 23) in the vibration process can be effectively reduced. Meanwhile, the gaps between the limiting column 013 and the first opening 022 and the second opening 021 may also be used as an expansion gap reserved for the lower diffusion sheet 231.

In some implementations, as shown in FIG. 8, a case where the backlight module 2 includes a light bar disposed at a side of the light guide plate 21 is taken as an example for illustration. In the embodiment, the lower diffusion sheet 231 of the optical sheet 23 is taken as an example for explanation, and other sheets of the optical sheet 23 also have the same hanger structure as the lower diffusion sheet 231. The lower diffusion sheet 231 includes a first side p1 and a second side p2 which are connected with each other, the first side p1 of the lower diffusion sheet 231 corresponds to the side edge of the light guide plate 231 for arranging the light bar, the second side p2 of the lower diffusion sheet 231 includes the coarse positioning hanger 012 and the fine positioning hanger 011 which are adjacently arranged, namely, the hanger 01 is arranged at the side edge adjacent to the side edge of the light guide plate 21 for arranging the light bar, and the hanger 01 includes a fine positioning hanger 011 and a coarse positioning hanger 012.

Figure 11:
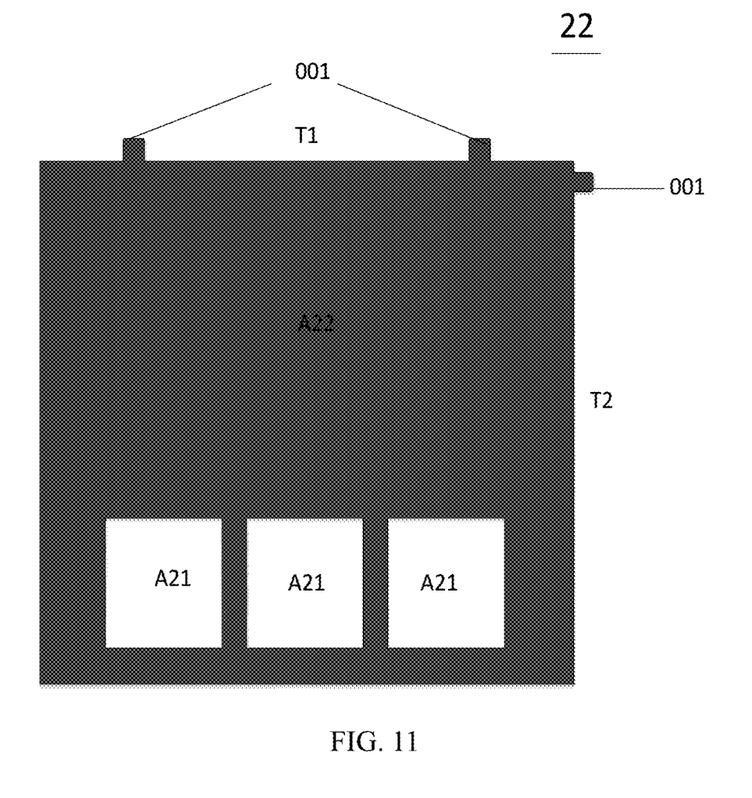
FIG. 11 is a schematic structural diagram of a reflective layer of a display panel according to an embodiment of the present disclosure.

Further, as shown in FIG. 11, the reflective layer 22 of the backlight module 2 is disposed between the light guide plate 21 and the back plate 11, and a position of the reflective layer 22 corresponding to the light transmissive area A21 of the backlight module 2 is a hollow-out structure.

Figure 12:
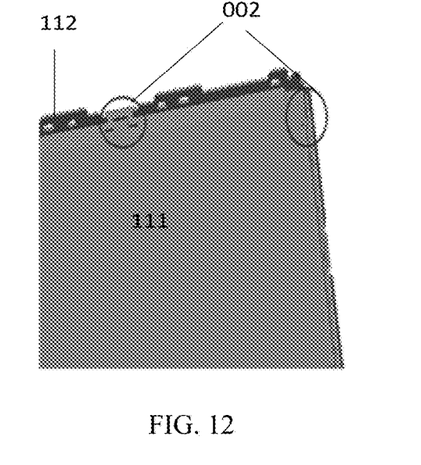
FIG. 12 is a schematic structural diagram of a groove on a side plate according to an embodiment of the present disclosure.

In some implementations, as shown in FIGS. 11 and 12, FIG. 12 is a partial schematic diagram of a groove 002 on a side plate 112 of the back plate 11, an edge of the reflective layer 22 is provided with a plurality of lugs 001, the side plate 112 of the back plate 11 is provided with a plurality of grooves 002, the lugs 001 and the grooves 002 correspond to each other one by one, when the reflective layer 22 is assembled on the back plate 11, alignment needs to be performed first, the lugs 001 on the reflective layer 22 may be clamped into the grooves 002 on the side plate 112, the lugs 001 and the grooves 002 can be abutted to assist alignment of the reflective layer 22 with the back plate 11, after the alignment is completed, the reflective layer 22 is fixed on a side of the back plate 11 proximal to the panel 3 by an adhesive layer, so as to prevent the reflective layer 22 from moving, and the adhesive layer may be, for example, a double-sided tape. The reflective layer 22 includes a first side T1 and a second side T2 that are connected to each other, the first side T1 of the reflective layer 22 is parallel to the X direction, the second side T2 of the reflective layer 22 is parallel to the Y direction, and in order to align the reflective layer 22 with the back plate 11 in both the X direction and the Y direction, lugs 001 may be disposed on both the first side T1 and the second side T2 of the reflective layer 22 (as shown in FIG. 11), and correspondingly, corresponding grooves 002 may be disposed on the sides of the side plate 112 corresponding to the first side T1 and the second side T2 of the reflective layer 22.

In some implementations, the width of the groove 002 on the side plate 112 is larger than a width of the lug 001 on the reflective layer 22, so as to avoid that the lug 001 cannot fit into the groove 002 due to the factors such as assembly tolerance and manufacturing precision, specifically, for example, the width of the groove 002 is larger than the width of the lug 001 by 0.1 mm.

In some implementations, as shown in FIG. 1, the display panel provided by the present embodiment further includes a transparent cover plate 4, the transparent cover plate 4 is disposed on a side of the back plate 11 away from the backlight module 2, and the transparent cover plate 4 covers the hollow-out areas A11 of the back plate 11 for protecting the inside of the display panel. The transparent cover plate 4 may be adhered to the back plate 11 by a double-sided tape 5, and the double-sided tape 5 may be disposed along the edge of the hollow-out areas A11. The material of the transparent cover plate 4 may include various transparent materials, such as polymethyl methacrylate (PMMA), and certainly, other materials may also be used, which are not limited herein.

Figure 13:
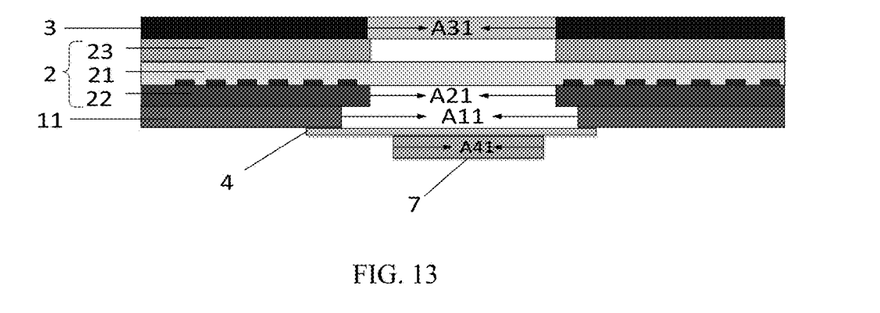
FIG. 13 is a side view of a display panel (including an external display panel) according to an embodiment of the present disclosure.

In some implementations, as shown in FIG. 13, where 7 represents an external display panel, an area of an orthographic projection of the hollow-out area A11 of the back plate 11 on a plane where the back plate 11 is located is greater than an area of an orthographic projection of the light transmissive area A21 of the backlight module 2 on the plane where the back plate 11 is located, so that if a display area of the external display panel 7 is disposed corresponding to the hollow-out area A11, the back plate 11 does not block the display area of the external display panel 7.

In some implementations, as shown in FIG. 1, the back frame 1 includes a middle frame 12, the middle frame 12 is fixed on the side plate 112 of the back plate 11 by a HOOK manner, the middle frame 12 has at least one snap-fit, the side plate 112 has at least one slot, the at least one snap-fit corresponds to the at least one slot one by one, the snap-fit is snapped into the slot to fix the middle frame 12 onto the side plate 112 of the back plate 11, and fixing the middle frame 12 to the back plate 11 by a HOOK manner can make assembly more convenient and faster.

In some implementations, a material of the middle frame 12 may include any one of various materials having thermoplasticity, for example, any one or a combination of Polycarbonate (PC) and Glass Fiber (GF), and a ratio of Polycarbonate (PC) and Glass Fiber (GF) may be adjusted as needed, for example, the material of the middle frame 12 may be composed of PC and 10% GF.

In some implementations, the back frame 1 includes an outer frame 13, the middle frame 12 is sleeved on the side plate 112 of the back plate 11, and the outer frame 13 is sleeved on the middle frame 12 to enclose the panel 3 in the back frame 1. The outer frame 13 may adopt an integrated structure in the embodiment, and may also adopt a sliced structure, that is, the outer frame 13 includes at least two sub-structures, and the material can be saved in the production process of the sliced outer frame 13.

In some implementations, the material of the outer frame 13 includes various metal materials, and may be any one of electro-galvanized steel sheet (EGI) and hot-dip galvanized steel sheet (SGCC), for example.

Figure 14:
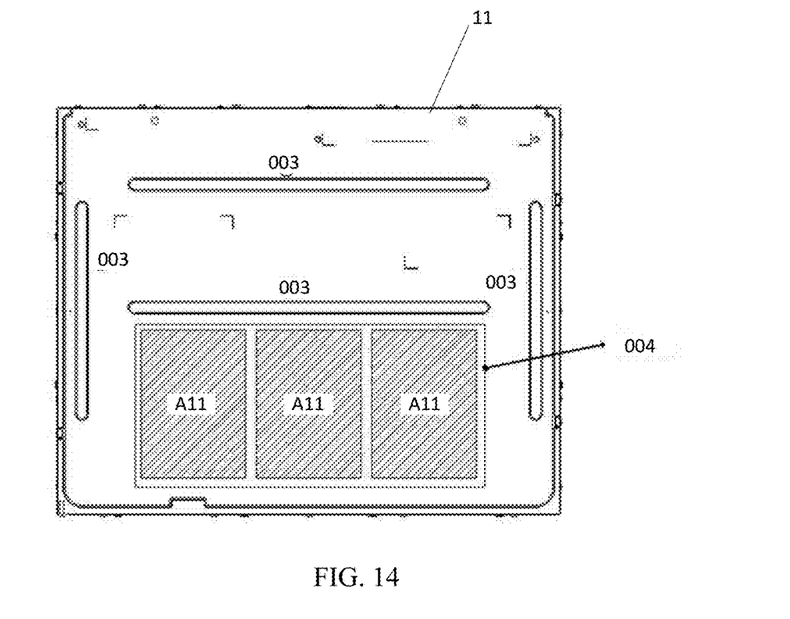
FIG. 14 is a schematic structural diagram of a side of back plate of a display panel according to an embodiment of the present disclosure.

In some implementations, as shown in FIG. 14, the back plate 11 includes a plurality of reinforcing ribs 003, the reinforcing ribs 003 are formed by bending and protruding the back plate 11 in a direction away from the backlight module 2, and the reinforcing ribs 003 are used for reinforcing the supporting force of the back plate. The reinforcing ribs 003 may be disposed at positions with weak supporting force, such as an edge area of the back plate 11 and an edge area of the hollow-out area A11, and may be specifically designed as needed, which is not limited herein.

In some implementations, as shown in FIG. 14, a back pressure line 004 is arranged along an edge of the hollow-out area A11 of the back plate 11, where the back pressure line 004 is a line that is embossed on the back plate 11 around the hollow-out areas A11 and protrudes toward a direction of the back plate 11 away from the backlight module 2, and the back pressure line is used to prevent the hollow-out areas A11 from deforming.

Figure 15:
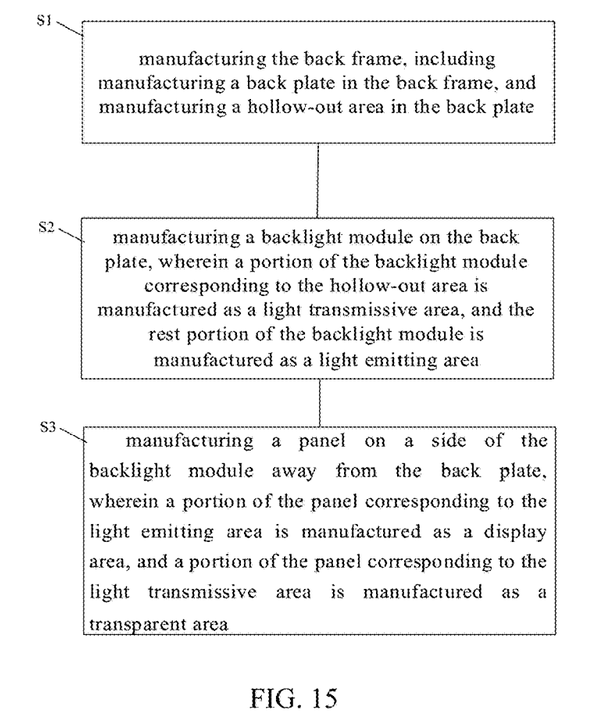
FIG. 15 is a flowchart of a method for manufacturing a display panel according to an embodiment of the present disclosure.

In a second aspect, an embodiment of the present disclosure further provides a method for manufacturing a display panel, including the following steps S1 to S3.

S1, manufacturing the back frame 1, including manufacturing a back plate 11 in the back frame 1, and manufacturing a hollow-out area A11 in the back plate 11.

Figure 16:
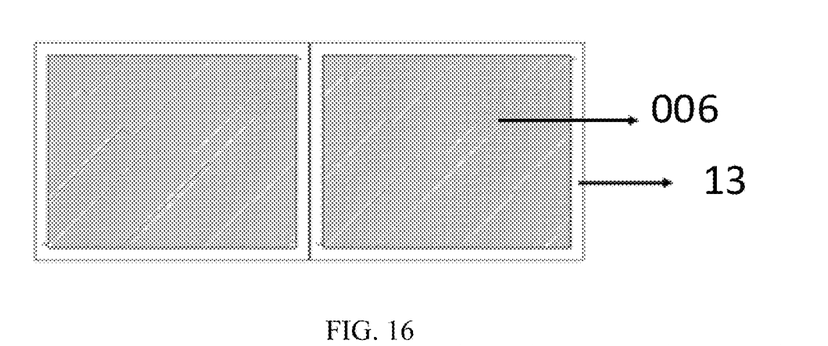
FIG. 16 is a schematic view illustrating manufacturing of an integrated outer frame according to an embodiment of the present disclosure.
Figure 17:
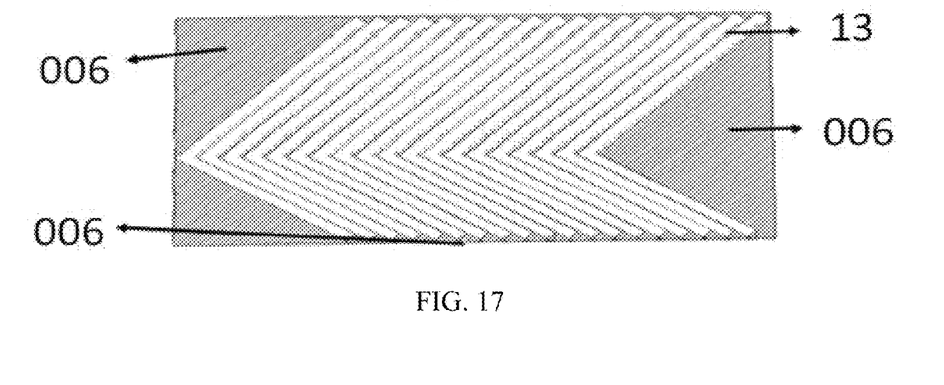
FIG. 17 is a schematic view illustrating manufacturing of a spliced outer frame according to an embodiment of the present disclosure.

Specifically, the manufacturing the back frame 1 includes manufacturing the back plate 11, a middle frame 12 and an outer frame 13. Here, the outer frame 13 having a spliced structure is described as an example. The outer frame 13 is made of electro-galvanized coiled materials through punch forming, FIG. 16 is a schematic diagram of the integrated outer frame 13 in the blanking stage, taking the outer frame 13 being in a shape of Chinese character "囗" as an example, since outer frames 13 are arranged side by side on the coiled materials, materials in the hollow-out areas of the outer frames 13 being in a shape of Chinese character "囗" are all waste materials 006, so that an area of the waste materials 006 is relatively large. In the embodiment, a spliced outer frame 13 is adopted, that is, the outer frame 13 includes at least two sub-structures, taking that the outer frame 13 includes two sub-structures as an example, the two sub-structures are, for example, sub-structures split along a diagonal line of the outer frame, and FIG. 17 is a schematic diagram of manufacturing the spliced outer frame 13. Through the reasonable typesetting to the coiled materials, for example, a plurality of sub-structures that form the outer frame 13 are arranged and aligned along the diagonal line, the sub-structures can be manufactured, and the waste materials 006 can be significantly reduced, therefore, adopting the spliced outer frame 13 can improve the utilization rate of coiled material, reduce the production of waste material. After the two sub-structures are manufactured, the two sub-structures are welded into a single piece by using laser welding to form a plate material being in a shape of Chinese character "囗", and finally plate material being in a shape of Chinese character "囗" is formed into the final outer frame 13 by punching. The flatness of the element can be effectively guaranteed through the laser welding process.

Further, the middle frame 12 may be formed by an integrated injection molding process.

S2, manufacturing a backlight module 2 on the back plate 11, where a portion of the backlight module 2 corresponding to the hollow-out area A11 is manufactured as a light transmissive area A21, and the remaining portion of the backlight module 2 is manufactured as a light emitting area A22.

Specifically, the backlight module 2 may include a reflective layer 22, a light guide plate 21, and an optical sheet 23. Portions of the reflective layer 22 and the optical sheet 23 corresponding to the light transmissive area A21 may be formed into hollow-out structures by opening. When the light guide plate 21 is manufactured, a plurality of light guide points are manufactured at a position of the light guide plate 21 corresponding to the light emitting area A22, and no light guide point is arranged and only the body of the light guide plate 21 is reserved at a position of the light guide plate 21 corresponding to the light transmissive area A21.

S3, manufacturing a panel 3 on a side of the backlight module 2 away from the back plate 11, where a portion of the panel 3 corresponding to the light emitting area A22 is manufactured as a display area A32, and a portion of the panel 3 corresponding to the light transmissive area A21 is manufactured as a transparent area A31.

Specifically, the display area A32 of the panel 3 is formed with pixel units, and the transparent area A31 of the panel 3 is provided with no pixel unit and can be filled with a transparent material.

In a third aspect, an embodiment of the present disclosure further provides a display device, including the display panel described above.

Specifically, the display device provided in the embodiment of the present disclosure may be any product or component with a display function, such as a mobile phone, a tablet computer, a television, a display, a notebook computer, a digital photo frame, a navigator and the like. The display device provided by the embodiment can be applied to an entertainment device or a slot machine, and the display device can normally display a picture at a position corresponding to the display area A32 of the panel 3, and a portion of the display device corresponding to the transparent area A31 of the panel 3 can be provided with various interaction devices required by the entertainment device, or a lottery device of the slot machine, and the lottery device can be used for displaying a lottery number and a lottery pattern of the slot machine, so that a multifunctional display effect can be realized. Other essential components of the display device are understood by those skilled in the art, and are not described herein or should not be construed as limiting the present disclosure.

In some implementations, as shown in FIG. 13, the display device being a slot machine is taken as example for illustration, the slot machine may include a lottery device 7, the lottery device 7 is disposed on a side of the back plate 11 away from the backlight module 2, the lottery device 7 is disposed corresponding to the hollow-out area A11 of the back plate 11, the light transmissive area A21 of the backlight module 2, and the transparent area A31 of the panel 3, and a lottery picture of the lottery device 7 may be displayed on a side of the panel 3 through the hollow-out area A11, the light transmissive area A21, and the transparent area A31, so that functions of displaying a picture and a lottery picture of the slot machine may be implemented.

In some implementations, as shown in FIG. 13, an area of an orthographic projection of the lottery device 7 on a plane where the back plate 11 is located is smaller than an area of an orthographic projection of the light transmissive area A21 of the backlight module 2 and/or the transparent area A31 of the panel 3 on the plane where the back plate 11 is located. An area of the orthographic projection of the light transmissive area A21 of the backlight module 2 and/or the transparent area A31 of the panel 3 on the plane where the back plate 11 is located is smaller than an area of an orthographic projection of the hollow-out area A11 of the back plate 11 on the plane where the back plate 11 is located. Therefore, if assembly tolerance exists, the lottery picture of the lottery device 7 can be prevented from being shielded by the back plate 11 or the backlight module 2.

It will be understood that the above embodiments are merely exemplary embodiments adopted to illustrate the principles of the present disclosure, and the present disclosure is not limited thereto. It will be apparent to those skilled in the art that various modifications and improvements can be made without departing from the spirit and scope of the present disclosure, and such modifications and improvements are also considered to be within the scope of the present disclosure.

The invention claimed is:

1. A display panel, comprising a back frame, a backlight module and a panel, wherein the backlight module and the panel are arranged in the back frame; the back frame comprises a back plate, and the back plate is provided with a hollow-out area;

the backlight module is arranged between the back plate and the panel and comprises a light transmissive area and a light emitting area, and the light transmissive area corresponds to the hollow-out area;

the panel is arranged on a side, away from the back plate, of the backlight module and comprises a display area and a transparent area, the display area corresponds to the light emitting area, and the transparent area corresponds to the light transmissive area.

2. The display panel of claim 1, wherein the backlight module comprises at least one light bar and a light guide plate; the light bar are arranged on a side of the light guide plate, the light guide plate is arranged on a side of the back plate proximal to the panel, and the light guide plate has a plurality of light guide points only at a position corresponding to the light emitting area.

3. The display panel of claim 2, wherein the back plate comprises a bottom plate and a side plate arranged at an edge of the bottom plate;

an edge of the light guide plate is provided with a plurality of notch grooves, a plurality of inner fasteners are arranged on the side plate, the notch grooves correspond to the inner fasteners in one by one, and the notch grooves are matched with the inner fasteners to fix the light guide plate to the back plate.

4. The display panel of claim 3, wherein the light guide plate comprises a first side and a second side which are opposite to each other, and a third side and a fourth side which are opposite to each other, the first side is disposed between the second side and the third side, the light bar are disposed on the first side of the light guide plate;

the edge of the light guide plate is provided with three notch grooves, comprising a first notch groove, a second notch groove and a third notch groove, wherein the first notch groove is arranged at a position of the third side proximal to the first side, the second notch groove is arranged at a position of the fourth side proximal to the first side, and the third notch groove is arranged at a position of the second side proximal to the fourth side;

the side plate is provided with three inner fasteners comprising a first inner fastener corresponding to the first notch groove, a second inner fastener corresponding to the second notch groove and a third inner fastener corresponding to the third notch groove.

5. The display panel of claim 4, wherein the light bar has a connector thereon for connecting an external backlight driving circuit;

a groove is formed at a position on the first side of the light guide plate corresponding to the connector, the groove and the third notch groove are oppositely arranged, the groove is configured to accommodate the connector, the groove is matched with the connector, and the third notch groove is matched with the third inner fastener to assist aligning of the light guide plate with the back plate.

6. The display panel of claim 3, wherein a width of each notch groove is larger than a width of each inner fastener; and a gap exists between opposite surfaces of the inner fastener and the notch groove.

7. The display panel of claim 1, wherein the backlight module comprises a light guide plate and an optical sheet, the light guide plate is disposed on a side of the back plate proximal to the panel, and the optical sheet is disposed on a side of the light guide plate away from the back plate; wherein,     a portion of the optical sheet corresponding to the light transmissive area is of a hollow-out structure.

8. The display panel of claim 7, wherein the back plate comprises a bottom plate and a side plate provided at an edge of the bottom plate;

an edge of the optical sheet is provided with a plurality of hangers, and each hanger has an opening therein, the bottom plate is provide with a plurality of limiting columns on a side of the bottom plate proximal to the optical sheet, the hangers are in one-to-one correspondence with the limiting columns, each of the limiting columns passes through the opening corresponding thereto to fix relative position of the optical sheet and the back plate.

9. The display panel of claim 8, wherein the hangers comprise a coarse positioning hanger and a fine positioning hanger, the coarse positioning hanger is provided with a first opening, and the fine positioning hanger is provided with a second opening;

the first opening is an elliptical opening, the second opening is a circular opening, a length of a short axis of the first opening is larger than or equal to a diameter of the second opening, and a length of a long axis of the first opening is larger than the diameter of the second opening.

10. The display panel of claim 9, wherein the backlight module further comprises a light bar disposed on a side of the light guide plate;

the optical sheet comprises a first side and a second side which are connected, the first side corresponds to a side edge of the light guide plate for arranging the light bar, and the second side of the optical sheet comprises a coarse positioning hanger and a fine positioning hanger which are adjacently arranged.

11. The display panel of claim 1, wherein the backlight module comprises a light guide plate and a reflective layer, the light guide plate is disposed on a side of the back plate proximal to the panel, the reflective layer is disposed between the light guide plate and the back plate, and a portion of the reflective layer corresponding to the light transmissive area is of a hollow-out structure.

12. The display panel of claim 11, wherein the back plate comprises a bottom plate and a side plate provided on an edge of the bottom plate;

an edge of the reflective layer is provided with a plurality of lugs, the side plate is provided with a plurality of grooves, the lugs correspond to the grooves one to one, and the lugs are matched with the grooves to assist aligning of the reflective layer with the back plate.

13. The display panel of claim 12 wherein a width of each groove is greater than a width of each lug.

14. The display panel of claim 1, wherein an area of an orthographic projection of the hollow-out area on a plane where the back plate is located is larger than an area of an orthographic projection of the light transmissive area on the plane where the back plate is located.

15. The display panel according to claim 1, wherein the back plate comprises a bottom plate and a side plate provided on an edge of the bottom plate;

the back frame further comprises a middle frame, at least one snap-fit is arranged on the middle frame, at least one slot is formed in the side plate, the least one snap-fit corresponds to the at least one slot one to one, and the snap-fit is matched with the slot to fix the middle frame onto the side plate of the back plate.

16. The display panel of claim 1, wherein the back plate comprises a bottom plate and a side plate provided on an edge of the bottom plate;
the back frame further comprises a middle frame and an outer frame, the middle frame is sleeved on the side plate, and the outer frame is sleeved on the middle frame; and
the outer frame is of a spliced structure.

17. The display panel of claim 1, further comprising a transparent cover plate disposed on a side of the back plate away from the backlight module and covering the hollow-out area,
wherein the back plate comprises a plurality of reinforcing ribs thereon, and the reinforcing ribs are formed by protruding the back plate in a direction away from the backlight module, and
wherein a back pressure line is provided along an edge of the hollow-out area of the back plate.

18. A method for manufacturing a display panel, comprising:
manufacturing a back frame, wherein a back plate in the back frame is manufactured, and a hollow-out area is manufactured in the back plate;
manufacturing a backlight module on the back plate, wherein a portion of the backlight module corresponding to the hollow-out area is manufactured as a light transmissive area, and the rest portion of the backlight module is manufactured as a light emitting area; and
manufacturing a panel on a side of the backlight module away from the back plate, wherein a portion of the panel corresponding to the light emitting area is manufactured as a display area, and a portion of the panel corresponding to the light transmissive area is manufactured as a transparent area.

19. A display device, comprising the display panel of claim 1.

20. The display device of claim 19, wherein the display device comprises a slot machine;
the display panel comprises the back frame, the backlight module and the panel, wherein the backlight module and the panel are arranged in the back frame;
the back frame comprises the back plate, and the back plate is provided with the hollow-out area;
the backlight module is arranged between the back plate and the panel and comprises the light transmissive area and the light emitting area, and the light transmissive area corresponds to the hollow-out area;
the panel is arranged on the side of the backlight module away from the back plate, and comprises the display area and the transparent area, the display area corresponds to the light emitting area, and the transparent area corresponds to the light transmissive area;
the slot machine comprises a lottery device which is arranged corresponding to the hollow-out area, the light transmissive area and the transparent area, the slot machine displays at a position corresponding to the display area, and lottery drawing is carried out at a position corresponding to the transparent area, and
wherein an area of an orthographic projection of the lottery device on a plane where the back plate is located is smaller than an area of an orthographic projection of the light transmissive area and/or the transparent area on the plane where the back plate is located;
the area of the orthographic projection of the light transmissive area and/or the transparent area on the plane where the back plate is located is smaller than an area of an orthographic projection of the hollow-out area on the plane where the back plate is located.

* * * * *